United States Patent
Chen et al.

(10) Patent No.: US 8,863,099 B2
(45) Date of Patent: Oct. 14, 2014

(54) COMPILATION AND PLACEMENT OF INSTRUCTIONS IN A MEMORY SYSTEM

(71) Applicant: International Business Machines Corporation, Armonk, NY (US)

(72) Inventors: Tong Chen, Yorktown Heights, NY (US); John K. O'Brien, South Salem, NY (US); Zehra Sura, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/668,745

(22) Filed: Nov. 5, 2012

(65) Prior Publication Data

US 2014/0130022 A1  May 8, 2014

(51) Int. Cl.
*G06F 9/45* (2006.01)

(52) U.S. Cl.
USPC ............................. 717/140; 717/139; 717/141

(58) Field of Classification Search
USPC .................................................. 717/136–145
IPC ................ G06F 8/43,8/423, 8/425, 8/427, 8/37, G06F 8/40, 8/41
See application file for complete search history.

(56) References Cited

U.S. PATENT DOCUMENTS

| | | | |
|---|---|---|---|
| 5,764,989 A * | 6/1998 | Gustafsson et al. .......... | 717/129 |
| 5,983,019 A * | 11/1999 | Davidson ...................... | 717/139 |
| 6,077,315 A * | 6/2000 | Greenbaum et al. .......... | 717/157 |
| 6,367,068 B1 * | 4/2002 | Vaidyanathan et al. ....... | 717/143 |
| 6,606,742 B1 * | 8/2003 | Orton et al. .................... | 717/140 |
| 6,820,255 B2 * | 11/2004 | Babaian et al. ............... | 717/151 |
| 7,340,728 B2 * | 3/2008 | Kutter ........................... | 717/139 |
| 7,383,542 B2 * | 6/2008 | Richardson et al. .......... | 717/137 |
| 7,685,577 B2 * | 3/2010 | Pace et al. ..................... | 717/136 |
| 8,079,023 B2 * | 12/2011 | Chen ............................. | 717/140 |
| 8,108,844 B2 * | 1/2012 | Crutchfield et al. .......... | 717/149 |

(Continued)

OTHER PUBLICATIONS

Rugina et al, "Symbolic Bounds Analysis of Pointers, Array Indices, and Accessed Memory Regions" ACM Transactions on Programming Languages and Systems, vol. 27, No. 2, pp. 185-235, 2005.*

(Continued)

*Primary Examiner* — Anil Khatri

(74) *Attorney, Agent, or Firm* — Cantor Colburn LLP; William Stock

(57) ABSTRACT

According to one embodiment of the present invention, a method for operation of a computer system including a main processor, a first and a second active memory device includes receiving an executable module generated by a compiler, wherein the executable module includes a code section identified as executable by a first processing element in the first active memory device and a second processing element in the second active memory device. The method further includes copying the code section to memory in the first device based on the code section being executable on the first device, copying the code section from the memory in the first active memory device to an instruction buffer of the first processing element and copying the code section from the memory in the first device to the second device based on the code section being executable on the second device.

18 Claims, 4 Drawing Sheets

(56) References Cited

U.S. PATENT DOCUMENTS

| | | | |
|---|---|---|---|
| 8,146,064 B2* | 3/2012 | Chen et al. | 717/141 |
| 8,239,843 B2* | 8/2012 | Song et al. | 717/149 |
| 8,276,131 B2* | 9/2012 | Langman et al. | 717/148 |
| 8,332,828 B2* | 12/2012 | Vargas | 717/137 |
| 8,370,819 B2* | 2/2013 | Chakraborty et al. | 717/148 |
| 8,510,723 B2* | 8/2013 | Barua et al. | 717/136 |
| 8,522,222 B2* | 8/2013 | Tillmann | 717/148 |
| 8,584,106 B2* | 11/2013 | Papakipos et al. | 717/140 |

OTHER PUBLICATIONS

Dhurjati et al, "Memory Safety Without Garbage Collection for Embedded Applications", ACM Transactions on Embedded Computing Systems, vol. 4, No. 1, pp. 73-111, 2005.*

Hicks et al, "Experience With Safe Manual MemoryManagement in Cyclone", ACM, pp. 73-84, 2004.*

* cited by examiner

COMPILATION AND PLACEMENT OF INSTRUCTIONS IN A MEMORY SYSTEM

BACKGROUND

The present invention relates to computer system management, and more specifically, to organizing placement of instructions in computer systems that include remote memory.

Computer systems often require a considerable amount of high speed memory, such as random access memory (RAM), to hold information, such as data and programs, when a computer is powered and operational. Memory device densities have continued to grow as computer systems have increased performance and complexity.

In operation, a compiler in memory receives a program and compiles it to produce an executable module. The executable module may include code that is placed into physical memory prior to or at runtime. In cases with computer systems including distributed processing and/or memory, code may be placed in memory at a first location that is not accessible by a processor at a second location.

SUMMARY

According to one embodiment of the present invention, a method for operating a computer system including a main processor, a first active memory device and a second active memory device includes receiving an executable module generated by a compiler, wherein the executable module includes a first code section identified as executable by a first processing element in the first active memory device and a second processing element in the second active memory device. The method further includes copying the first code section to memory in the first active memory device based on the first code section being executable on the first active memory device, copying the first code section from the memory in the first active memory device to an instruction buffer of the first processing element and copying the first code section from the memory in the first active memory device to the second active memory device based on the first code section being executable on the second active memory device.

According to one embodiment of the present invention, a method for a compiler to produce an executable module to be executed by a computer system including a main processor and an active memory device includes dividing source code into code sections and identifying, by the compiler, a first code section that is executable by the main processor and a processing element in the active memory device, wherein the first code section is one of the code sections. The method also includes transforming, by the compiler, the first code section to executable module code for execution on the main processor and execution on the processing element in the active memory device, wherein the executable module code determines a processor type for execution based on successfully acquiring access to the processing element in the active memory device.

DETAILED DESCRIPTION

Figure 1:
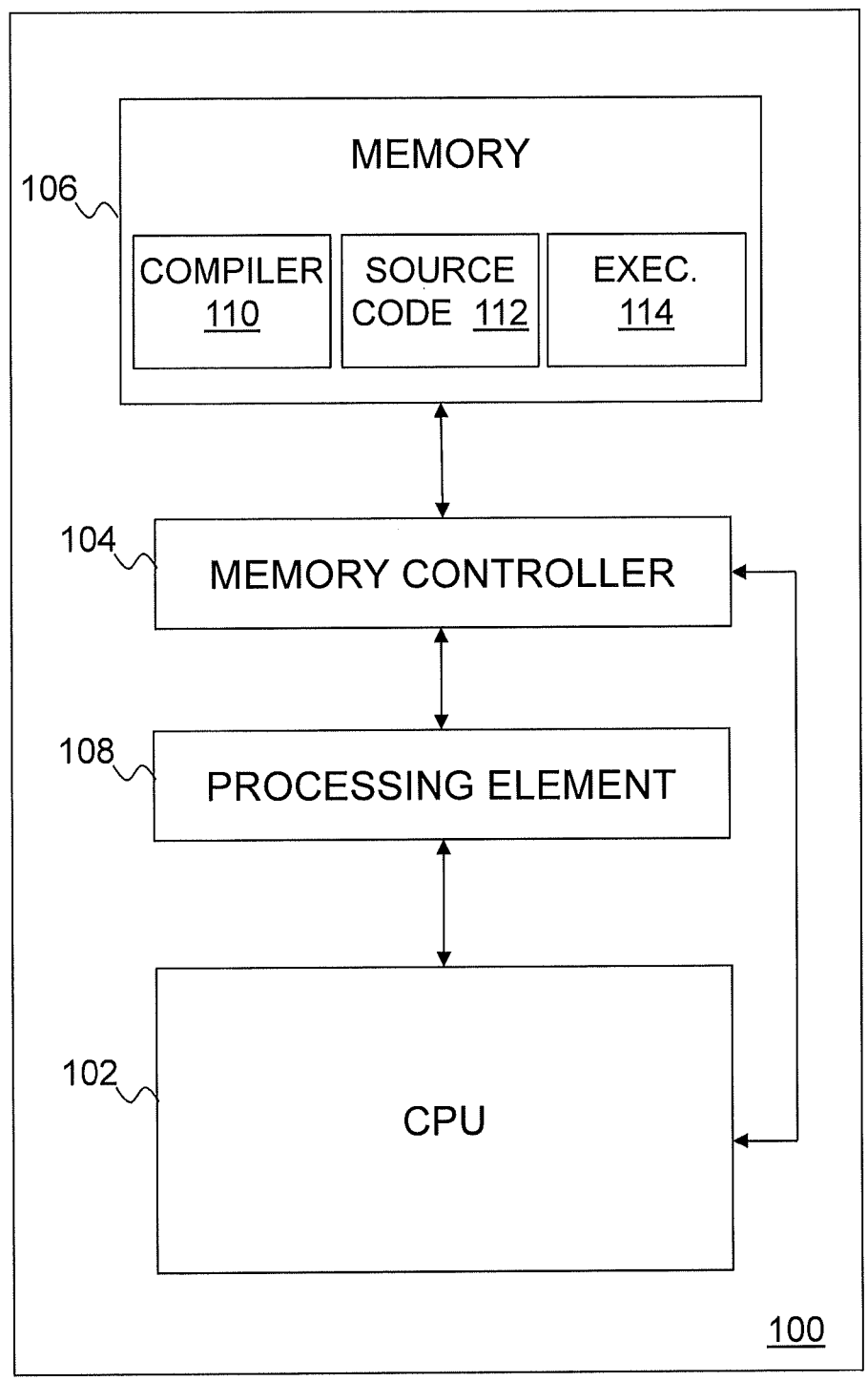
FIG. 1 illustrates a block diagram of a computer system in accordance with an embodiment.

An embodiment is directed to a computer system with a main processor and a plurality of active memory devices. In particular, a compiler provides an executable module for execution on the main processor and the active memory devices, where a code section of the executable module is copied to a first active memory device and is also copied to the second active memory device. Embodiments include copying the code section into memory of the first active memory device and copying the code section into an instruction buffer in a processing element of the first active memory device for execution by the processing element. In addition, the code section is copied from the memory of the first active memory device to memory of the second active memory device. The code section is then copied from memory in the second active memory device to an instruction buffer in a processing element of the second active memory device, where the code section is executed by the processing element. In an embodiment, the system design may restrict the memory locations from which instructions can be copied to the instruction buffer of a processing element in an active memory device to only those memory locations contained within that active memory device. By copying the code section to the first and second active memory devices, processing elements in each of the devices are able to copy and execute the code section from memory within the device, thus enabling execution of the executable module at several locations in the computer system. The executable module may be created by a compiler running on a computer system, where the executable module is executed on the same computer system that the compiler generates the executable module. In another embodiment, the compiler generates the code on a first computer system and transmits the executable module to a second computer system for execution. The transmission of the executable module may be by any suitable means, such as a network.

In one embodiment, an improved compiler receives source code and divides the code into code sections. By default, all code sections may be executed on the main processor. The compiler also identifies selected code sections to be executable on the active memory devices. The compiler then transforms the selected code sections to executable module code for execution on the main processor and the active memory devices. In particular, there are at least two copies corresponding to each selected code region in the executable module code, with one copy containing instructions for execution on a main processor, and another copy containing instructions for execution on a processing element in an active memory device. In an embodiment, the executable module code provides for selecting or choosing where the selected code regions will be executed based on the ability of the executable module to acquire access to processing elements in the active memory devices, where access enables execution of the code by the processing elements. Access may only be granted if the processing elements are available and not being utilized. For example, if the executable module is able to acquire access to processing elements in a first and second active memory device, the executable module code is then copied to memory and instruction buffers of the first and second devices, as described above. If the executable module is not able to acquire access to processing elements, the executable module code is then run on the main processor. In one embodiment, once the compiler has transformed the source code and compiled the code into the executable module, the executable module is loaded into memory where the initial memory location in which to load the executable module is determined by an operating system. Further, the executable module makes calls to an operating system to perform the code copying and to manage the transfer of selected sections of the executable module code between memory locations across multiple active memory devices.

In an embodiment, the active memory device includes a processing element in a memory device, as discussed below. In embodiments, the processing element is capable of performing a variety of tasks, such as arithmetic operations, loads, stores and decrements. In one embodiment, the processing element receives a command from the main processor, where the command includes a series of instructions to be performed by the processing element. In one embodiment, the processing element is part of a memory system including an active memory device, such as an active buffered memory device. The memory device may be any suitable memory device including one or more memory device (e.g., random access memory "RAM" chips) connected to a memory controller chip configured to control the memory device. In an embodiment, the active memory device includes layers of memory that form a three dimensional ("3D") memory device where individual columns of memory chips form stacks or vaults in communication with the controller chip. In one embodiment, a plurality of memory stacks are located on an active memory device, where each stack has a respective memory controller. The stacks may also include a processing element configured to communicate with the memory and other processing elements in the active memory device. In other embodiments, processing elements are physically separated from the memory stacks but are still part of the active memory device, where the processing elements are pooled and available to perform instructions using any of the memory stacks within the device. The processing element can receive commands or instructions from a main processor and perform operations based on the received commands. In an embodiment, a processing element accesses a selected address in a vault through an interconnect network. In one embodiment, a plurality of memory devices, stacks and processing elements may communicate via the interconnect network, such as a crossbar switch. In embodiments, a memory stack includes multiple DRAM dies stacked together, where each DRAM die is divided into a number of banks. Further, in the example, a group of banks in each die, vertically aligned, may be referred to as a vault accessed by a vault controller or memory controller.

Embodiments include a memory stack with a processing element and memory controller, referred to as an active memory device. The active memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor.

In one embodiment, the active memory device is configured to load configuration information or instructions from a part of the active memory device into a processing element following receiving a command from an external requestor in the computing system, such as a main processor or another processing element. In addition, the processing element may perform virtual-to-real address translations that it computes while executing the loaded instructions.

In embodiments, it is desirable to have processing capabilities within the active memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory, the system's main processor configures the processing elements within the active memory device, and then instructs them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

FIG. 1 illustrates a block diagram of a computer system for execution of applications in accordance with an embodiment. A computer system 100 depicted in FIG. 1 includes a computer processor 102, a memory 106 having memory devices, as well as a memory controller 104 and processing element 108.

In one embodiment, the memory 106 and memory controller 104 is coupled to the computer processor 102 and processes write requests from the computer processor 102. In one example, the write requests contain data to be written to the memory 106 and a memory location of the instruction(s), where the instruction forms the virtual address for the data to be written. The memory controller 104 stores data at a real address within the memory 106. In another example, the computer processor 102 maps the virtual address to a real address in the memory 106 when storing or retrieving data. In the example, the write requests contain data to be written to the memory 106 and the real address identifying the location in the memory 106 to which the data will be written. The real address for a given logical address may change each time data in the memory 106 is modified.

In an embodiment, the command from the computer processor 102 specifies a sequence of instructions that include setup actions, execution actions and notification of completion actions. The setup actions may include configuration actions such as a command that loads configuration information from the memory within the memory device directly into the processing element 108. By providing the configuration information in the memory device, the processing element 108 is able to be properly configured after receiving a command. In an embodiment, configuration information may include information used to translate between virtual addresses and real addresses in the memory. Further, configuration information may include information to maintain coherence, by ensuring accuracy and consistency, of memory mapping and translation between the processing element and a requestor (e.g., main processor). The setup actions may also include the loading of code, such as a sequence of instructions, from the memory 106 into the processing element 108. The execution actions include execution of the code that includes load, store, arithmetic/logical and other instructions.

In an additional mode of an embodiment, the processing element 108 is coupled to the main processor or computer processor 102 and receives a command from the computer processor 102. The command corresponds to instructions stored in the memory to perform write requests for data to be written to the memory 106. In the embodiment, the instruction(s) executes and forms the virtual address corresponding to the write location in memory 106. The command may include a real address where the instruction(s) are stored. The memory controller 104 and/or processing element 108 stores data at a real address within the memory 106. In an embodiment, the processing element 108 maps the virtual address to a real address in the memory 106 when storing or retrieving data. The real address for a given logical address may change each time data in the memory 106 is modified. The computer processor 102 provides commands to the memory 106, where the processing element 108 receives the command and fetches corresponding instructions from the memory. In an embodiment, the processing element 108 receives a task as part of the command, where a part of the task may be sent back to the computer processor 102 for execution. The computer processor 102 may be better suited to execute functions specified by the task due to several factors, such as data location and support for the functions. In an embodiment, the memory 106, memory controller 104 and processing element 108 are combined into a single device, such as an active memory device, in communication with the main processor 102.

The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, processing element 108 and computer processor 102.

The memory 106 may store one or more separate programs, each of which comprises an ordered listing of executable module instructions for implementing logical functions. For example, software stored in the memory 106 may include an operating system (not shown), source code 112, and one or more applications. As shown in FIG. 1, the memory 106 stores source code 112 and a compiler 110. The compiler 110 may alternatively be stored and executed on a system that is external to the system 100 for which it produces executable module programs, such as executable module 114. The compiler 110 includes numerous functional components for implementing the features, processes, methods, functions, and operations of the exemplary embodiments, as will be described further herein. Optimized code is executed in a runtime environment (not shown) of the system 100.

The applications may include a source code 112, executable module program (object code), script, or any other entity comprising a set of instructions to be performed. When the application is source code 112, the program code is translated via the compiler 110 to the executable module 114.

Figure 2:
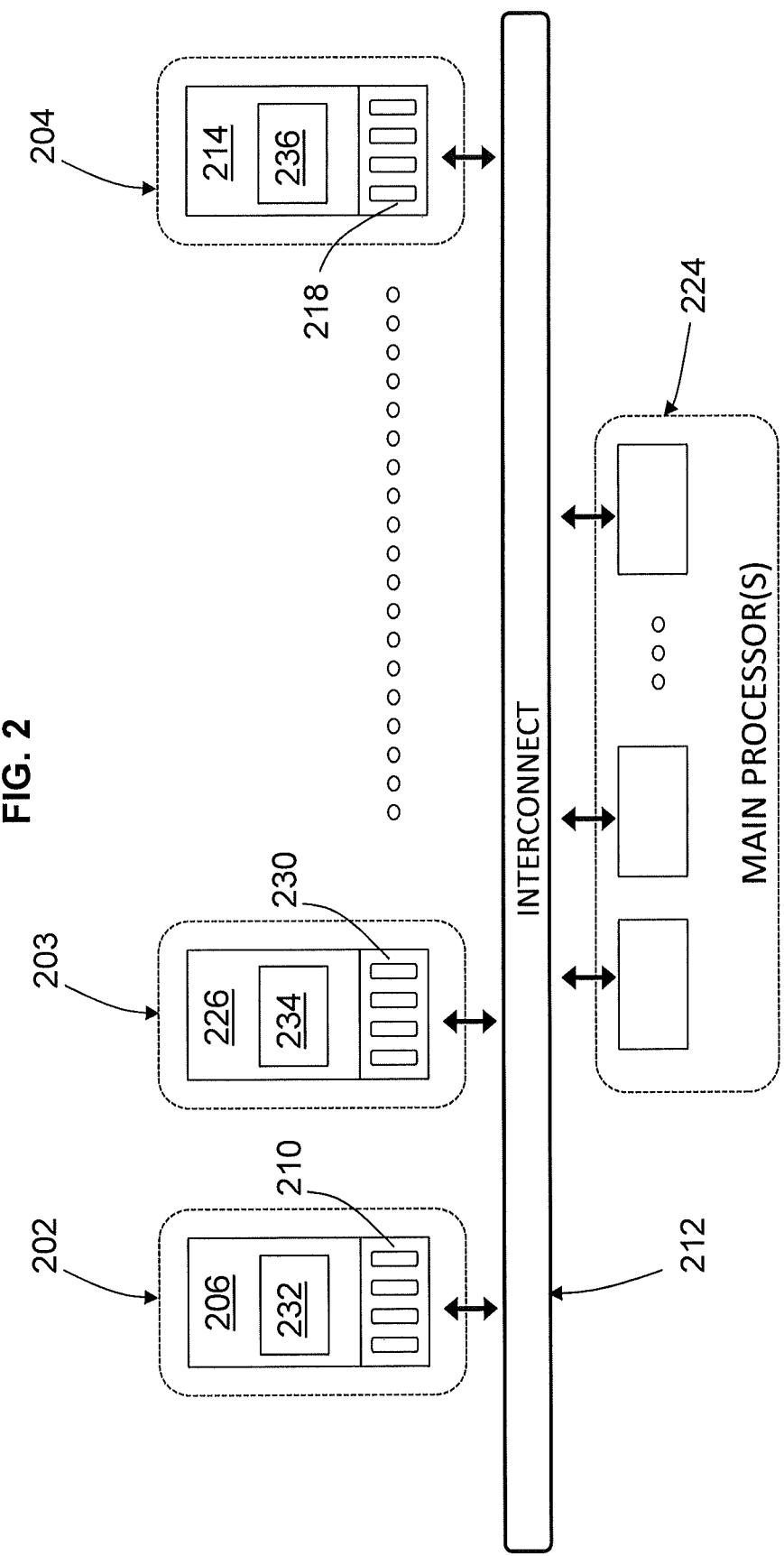
FIG. 2 illustrates a block diagram of a computer system with a main processor, memory and processing elements in accordance with an embodiment.

FIG. 2 is a schematic diagram of an embodiment of a computer system 200 implementing dynamic memory page management. In one embodiment, the computer system 200 includes an active memory device 202, an active memory device 203 and an active memory device 204. The active memory device 202 includes a memory vault 206 and a processing element 210. In an embodiment, the processing element 210 in the active memory device 202 is coupled to and communicates with the active memory devices 203 and 204 via an interconnect network 212. The interconnect network 212 is also coupled to one or more main processors 224, thus enabling communication between the main processors 224 and active memory devices 202, 203, 204. The interconnect network 212 provides a fast and high bandwidth path for communication between portions of the device, such as processing elements, memory controllers and memory, to provide improved performance and reduced latency for the computer system 200 using active memory.

The active memory device 203 includes a memory vault 226 and a processing element 230. Similarly, the active memory device 204 includes a memory vault 214 and a processing element 218. In an embodiment, the processing elements 210, 230, 218 and memory vaults 206, 226, 214 are located within a single stack. By positioning the processing element in the same memory device as the memory vault, latency is reduced when accessing locations in the memory vault, thus further improving performance. Embodiments of the active memory devices may each include a plurality of stacks, where each stack includes a memory vault and a processor. For example, the active memory devices 202, 203 and 204 may include multiple layers of stacked addressable memory elements. Further, the stack's memory may be divided into memory vaults 206, 226 and 214, or three-dimensional blocked regions of the memory device which share a common memory controller and/or memory element, and are capable of servicing memory access requests to their domain of memory independently of one another. In one embodiment with processing elements located in each active memory device, the processing element may only have access to instructions in memory within the device. Accordingly, a processing element located in the active memory device 202 is not able to execute instructions, such as code section 234, located in memory of the active memory device 203. Thus, code sections 232, 234 and 236 are copied to respective memory 206, 226 and 214, to enable execution of the code sections by each active memory device. In an embodiment, the compiler 110 (FIG. 1) divides source code 112 into code sections, where selected sections are identified as executable on active memory devices. Embodiments described herein provide improved executable modules from compilers that copy selected code sections to memory in selected active memory devices to provide distributed execution of a program, thus utilizing the entire system to improve performance and efficiency.

In embodiments, the processing elements, memory vaults and memory controllers may be arranged in a suitable manner depending on the application. For example, one or more processing elements may be positioned on one side of the interconnect network 212 and may operate as a pool of processing elements that are available for accessing any memory (e.g., memory vault) in the memory system coupled to the interconnect network 212. The pooled processing elements are not limited to accessing a particular memory vault and, thus, one or more elements may be utilized upon receiving a command from the main processor 224.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by external requestors, like the main processor, coupled to the interconnect network.

The process for creating and executing executable module code may be implemented using the system and components described in FIGS. 1-2. The system has at least two distinct processor types, the main processors 224 and the processing elements 210, 230, 218. The different processor types have different characteristics that impact the performance of code that executes on them, e.g. the processing elements have higher memory bandwidth, lower latency to main memory, higher degree of multi-processing, richer set of vector instructions, and more power efficient computation compared to the main processors. On the other hand, the main processors have access to privileged operations through the operating system, support a stack and traditional calling conventions that allow for generic and recursive function calls, have data and instruction caches, and implement speculative out-of-order execution to enable faster execution times. As a result, certain code sections will exhibit better power-performance characteristics on the main processors (e.g. code with lots of memory re-use, or branches and calls), while certain other code sections will exhibit better power-performance characteristics on the processing elements (e.g. code that performs random accesses on large datasets, or streaming computation). To maximize utilization of the whole system and achieve the fastest execution, work must be judiciously divided between the different processor types. The compiler process described in FIG. 3 can optimize the distribution of work across the main processors and processing elements such that all processors in the system are optimally utilized.

Further, the system and components described in FIGS. 1-2 provide opportunities for optimization, e.g., execution time can be improved by exploiting the many more levels of parallelism available in the system (different types of processors, multiple processors of each type, slices within processing elements, vector processing, and multi-threading). However, the system may also have new constraints, e.g. the factors such as power budget may not allow all processors in the system to be simultaneously active. Both these features directly impact the process of optimally distributing work, requiring improved analysis in the compiler process described in FIG. 3. For instance, a code section may be scheduled for execution on a processing element even though it has better power-performance characteristics on a main processor, because the power constraints do not allow the main processor to be active at that point in the execution. Parameters may be configured via the compiler and used to assess whether a code section should be executed on a main processor or a processing element. For example, a parameter may evaluate whether, upon execution of a code section, a main processor may be active due to power constraints determined as a current state of the system. A value of True, or Yes, results in execution of the code section on the main processor, while a value of False, or No, results in execution of the code section on a processing element.

Figure 3:
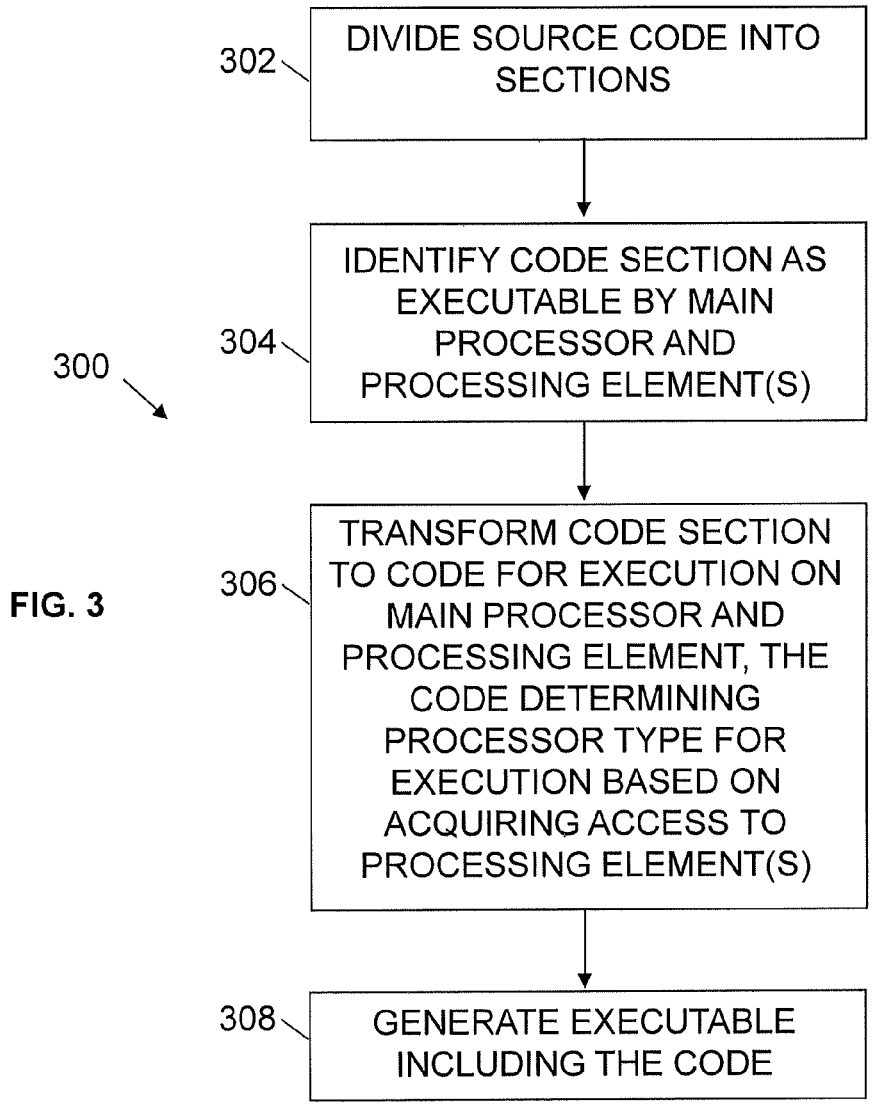
FIG. 3 illustrates a flow diagram of a method for providing an executable module to be executed by a computer system in accordance with an embodiment.

FIG. 3 is a flow chart 300 of an exemplary process for providing an executable module to be executed on a computer system, such as the systems in FIGS. 1 and 2. In an embodiment, the blocks in the flow chart 300 are performed by a compiler operating in memory of a computer system. In block 302, the compiler divides source code into a plurality of code sections including a first code section. In block 304, the first code section is identified as executable, depending on the runtime system state, either by a main processor or by one or more processing elements in one or more respective active memory devices, where the main processor and active memory devices are in a computer system. In block 306, the first code section is transformed to executable module code for execution on the main processor and one or more processing elements, where the executable module code determines the processor type, such as main processor or processing element, for execution based on acquiring access to processing elements during run time. The executable module contains two copies or versions of code corresponding to the first code section, where one copy contains instructions for executing the code section on one or more main processors, and the other copy contains instructions for executing the code section on one or more processing elements in an active memory device. In an embodiment, the executable module may include a version of code corresponding to the first code section that contains instructions for executing the code section on multiple processing elements spread across multiple active memory devices. The process in block 306 may be repeated for each code section identified to be executable both by a main processor and by processing elements in active memory devices. In block 308, the compiler generates the executable module for performance by the computer system, where the executable module includes the executable module code previously discussed. In an embodiment, the compiler optimizes the generated executable module code to minimize the size of code to be copied and the number of times code is copied between multiple memory locations during execution, for example, by judiciously selecting placement of instructions within the generated executable module and by choosing specific processing elements for execution.

Figure 4:
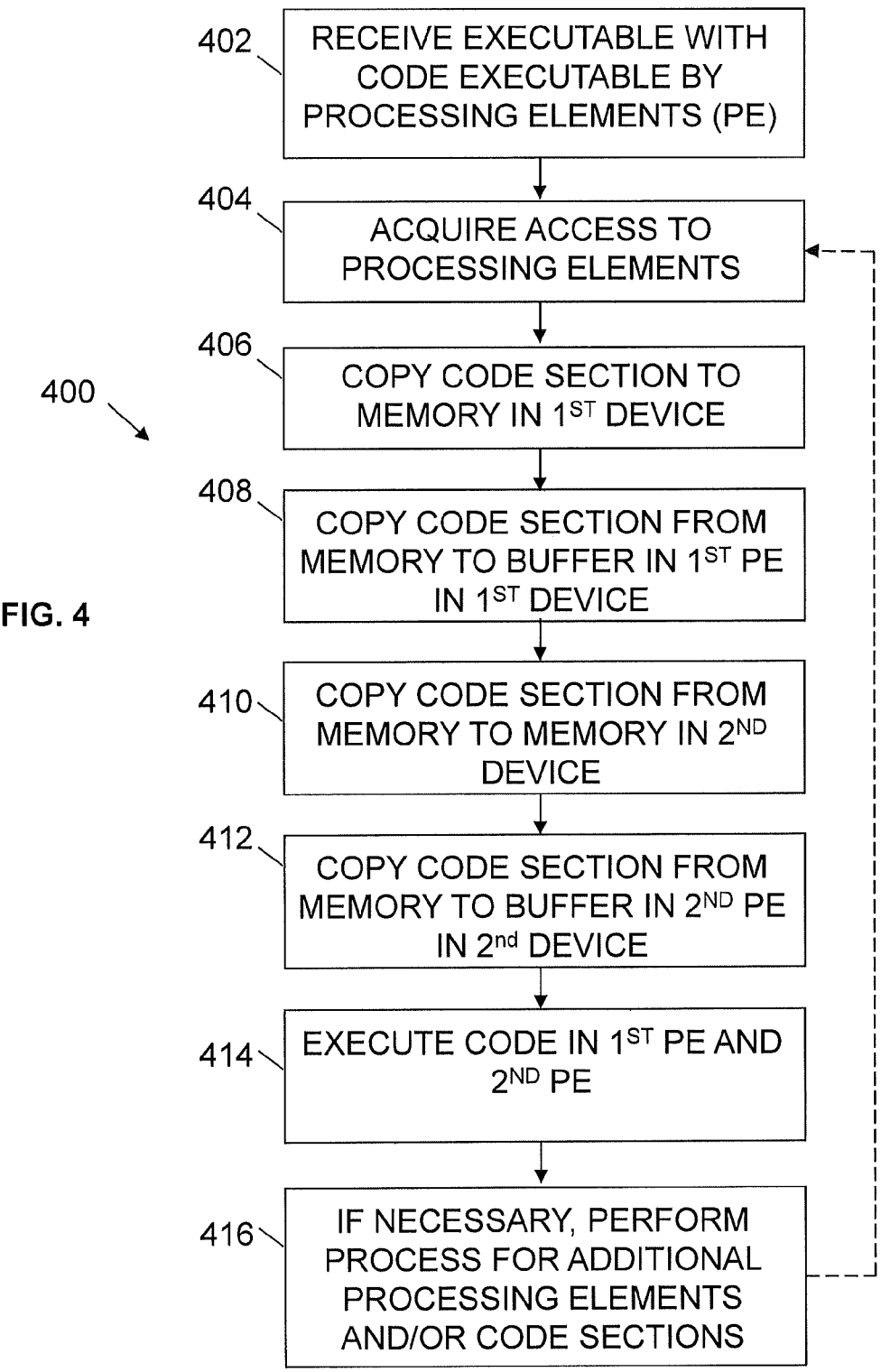
FIG. 4 illustrates a flow diagram of executing an executable module in a computer system in accordance with an embodiment.

FIG. 4 is a flow chart 400 of an exemplary process for executing an executable module on a computer system, such as the systems in FIGS. 1 and 2. In an embodiment, the blocks in the flow chart 400 are performed by hardware in the computer system (e.g., main processor, processing element, memory) running the executable module and compiler-generated code in the executable module using services provided by an operating system. In block 402, a compiler generated executable module is received that includes a first code section identified as capable of execution by first and second processing elements located in first and second active memory devices, respectively. In an embodiment, the executable module is received by a main processor of a computer system. In block 404, the main processor acquires access to processing elements, such as the first and second processing elements, where the processing elements are located in respective active memory devices in the computer system. On successful acquisition of the processing elements, a subsequent execution is performed as a distributed execution of portions of the executable module. In an embodiment where the main processor is not able to acquire access to the processing elements, the executable module will be performed entirely by the main processor, instead of at least partially performed by the processing elements.

In block 406, the first code section is copied into memory of the first active memory device, if it is not already physically located in the memory of the first active memory device. In the case where the code is already located in the same active memory device as the processing element on which it is to execute, the step of copying code into the memory of the processing element is simply skipped. In block 408, the first code section is copied from the memory to an instruction buffer in the first processing element of the first active memory device. In block 410, the first code section is copied from memory in the first active memory device to a memory in a second active memory device, if it is not already physically located in the memory of the second active device. In block 412, the first code section is then copied from the memory to an instruction buffer in the second processing element of the second active memory device. In block 414, the first code section in the instruction buffers is then executed by the first and second processing elements. In block 416, the process may be repeated or done in parallel with additional processing elements in different active memory devices, and/or code sections that are executable on processing elements. In one example, access is also acquired to a third processing element. In the example, a second code section is copied to the memory in the first active memory device if it is not already physically located in the memory of the first active memory device, the second code section being part of the executable module. The second code section is then copied from the memory in the first active memory device to the instruction buffer in the first processing element. Then, the second code section from the memory in the first active memory device is copied to memory in a third active memory device including the third processing element, if it is not already physically located in the memory of the third active memory device. The second code section may then be copied from the memory to an instruction buffer in the third processing element. Further, the second code section is then executed by the first processing element and by a third processing element.

In an embodiment, after execution of the first code section, the first and second processing elements are then released, thus becoming available for execution of other code sections. Thus, executable module code may be generated and used to acquire and release access to selected processing elements.

In embodiments, the compiler, together with a runtime system, and relying on operating system support for virtual to real mapping of addresses, will ensure that the appropriate instructions are either located in the appropriate physical memory, or are copied to the appropriate physical memory or memories in the active memory devices on which these instructions are to execute. Accordingly, in an embodiment, the compiler will determine, either statically or dynamically, for each sequence of instructions, the physical location or locations of the data on which this sequence will operate. These locations identify the active memory device(s) that will need to execute the instructions. The compiler will generate code, possibly including calls to functions within a runtime system, to cause the allocation, relocation or mirroring of the instruction sequence onto memory in the same physical memory devices.

In an embodiment of a compiler, the compiler recognizes a code section of an executable module as to be performed by active memory devices. The compiler then outlines the active memory device code section, generate active memory device instructions for the outlined code, which are stored in a program text section for the executable module. Then, the compiler generates wrapper (host) instructions to launch the active memory instruction sequence and inserts host instructions in the original code section of the executable module to check if active memory devices are available. The compiler then inserts host instructions to invoke the outlined procedure if active memory devices are available.

In one embodiment during operation of a computer system, a host program encounters the call to outlined active memory device procedure (after verifying active memory devices are available). The operation invokes a runtime system to acquire required number of active memory devices and processing elements or lanes on those devices. Then the operation ensures data is allocated on physical memory of those active memory devices and copies the instruction sequences to each devices physical address space and then starts execution of the active memory devices.

In a case with a computer system including distributed processing and/or memory (such as active memory devices), executable module code may be placed in memory at a first location that is not accessible by a processor at a second location, thus the processor at the second location is unable to efficiently execute the code from the executable module.

Technical benefits include improved efficiency and performance of code by computer systems by providing selected code to active memory in the systems. By copying the code section to active memory devices, processing elements in each of the active memory devices are able to execute the code section from memory within the device, thus enabling efficient execution of the executable module at several locations in the computer system.

In an embodiment, a system and method for a compiler to produce an executable module to be executed by a computer system including a main processor and an active memory device is provided, the system and method comprising: dividing source code into code sections; identifying, by the compiler, a first code section that is executable module by the main processor and a processing element in the active memory device, wherein the first code section is one of the code sections; and transforming, by the compiler, the first code section to executable module code for execution on the main processor and execution on the processing element in the active memory device, wherein the executable module code determines a processor type for execution based on successfully acquiring access to the processing element in the active memory device. The system may be configured to perform the method in an embodiment.

In an embodiment, identifying, by the compiler, the first code section that is executable by the main processor and the processing element in the active memory device comprises identifying a first code section that is executable by the main processor and a first processing element in a first active memory device and a second processing element in a second active memory device. In an embodiment, transforming, by the compiler, the first code section to executable module code for execution on the main processor and execution on the processing element in the active memory device comprises transforming the first code section to executable module code for execution on the main processor and execution by the first processing element, wherein the executable module code includes copying a portion of the executable module code from the first active memory device to the second active memory device.

In an embodiment, transforming, by the compiler, the first code section to executable module code for execution on the main processor and execution on the processing element in the active memory device comprises generating device acquisition executable module code configured to acquire access to the processing element in the active memory device prior to execution of the executable module code on the processing element in the active memory device. In an embodiment, transforming, by the compiler, the first code section to executable module code for execution on the main processor and execution on the processing element in the active memory device comprises generating device release executable module code configured to release the processing element in the active memory device following execution of the first code section by the processing element in the active memory device.

In an embodiment, transforming, by the compiler, the first code section to executable module code for execution on the main processor and execution on the processing element in the active memory device comprises transforming executable module code for execution by a first processing element in a first active memory device, the executable module code comprising: copying the first code section to memory in the first active memory device; and copying the first code section from the memory in the first active memory device to an instruction buffer in the first processing element. In an embodiment, the executable module code further comprises: copying the first code section from the memory in the first active memory device to a second active memory device. In an embodiment, copying the first code section from the memory in the first active memory device to the second active memory device comprises copying the first code section from the memory in the first active memory device to memory in the second active memory device.

In an embodiment, the executable module code further comprises copying the first code section from the memory in the second active memory device to a second instruction buffer in a second processing element in the second active memory device. In an embodiment, the executable module code further comprises executing the first code section in the first processing element and executing the first code section in the second processing element.

In an embodiment, the executable module code further comprises: copying a second code section to memory in the first active memory device, the second code section being part of the executable module code; copying the second code section from the memory in the first active memory device to the instruction buffer in the first processing element; and copying the second code section from the memory in the first active memory device to a third active memory device, wherein the computer system further includes the third active memory device. In an embodiment, the executable module code further comprises executing the second code section in the first processing element and executing the second code section in a third processing element in the third active memory device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for executable module operating a computer system including a main processor, a first active memory device and a second active memory device, the method comprising:
   receiving an executable module generated by a compiler, wherein the executable module comprises a first code section identified as executable by a first processing element in the first active memory device and a second processing element in the second active memory device;
   wherein the first active memory device comprises a first memory vault and the first processing element, the first memory vault services memory requests to a domain in the first memory vault;
   wherein the second active memory device comprises a second memory vault and the second processing element, the second memory vault services memory requests to a domain in the second memory vault;
   copying the first code section to first memory vault in the first active memory device based on the first code section being executable on the first active memory device;
   copying the first code section from the first memory vault in the first active memory device to an instruction buffer of the first processing element; and
   copying the first code section from the first memory vault in the first active memory device to the second active memory device based on the first code section being executable on the second active memory device;
   acquiring access to the first processing element and the second processing element prior to copying the first code section to first memory vault in the first active memory device.

2. The method of claim 1, wherein copying the first code section from the first memory vault in the first active memory device to the second active memory device comprises copying the first code section from the first memory vault in the first active memory device to the second memory vault in the second active memory device.

3. The method of claim 2, further comprising copying the first code section from the second memory vault in the second active memory device to a second instruction buffer in the second processing element.

4. The method of claim 2, further comprising executing the first code section by the first processing element and executing the first code section by the second processing element.

5. The method of claim 1, further comprising:
copying a second code section to the first memory vault in the first active memory device, the second code section being part of the executable module;
copying the second code section from the first memory vault in the first active memory device to the instruction buffer in the first processing element; and
copying the second code section from the first memory vault in the first active memory device to a third active memory device, wherein the computer system further includes the third active memory device.

6. The method of claim 5, further comprising executing the second code section by the first processing element and executing the second code section by a third processing element in the third active memory device.

7. The method of claim 1, further comprising releasing the first processing element and the second processing element following execution of the first code section by the first processing element and the second processing element.

8. A method for a compiler to produce an executable module to be executed by a computer system including a main processor and an active memory device, the method comprising:
dividing source code into code sections;
identifying, by the compiler, a first code section that is executable by the main processor and a processing element in the active memory device, wherein the first code section is one of the code sections; and
transforming, by the compiler, the first code section to executable module code for execution on the main processor and execution on the processing element in the active memory device, wherein the executable module code determines a processor type for execution based on successfully acquiring access to the processing element in the active memory device;
wherein identifying, by the compiler, the first code section that is executable by the main processor and the processing element in the active memory device comprises identifying a first code section that is executable by the main processor and a first processing element in a first active memory device and a second processing element in a second active memory device;
wherein the first active memory device comprises a first memory vault and the first processing element, the first memory vault services memory requests to a domain in the first memory vault; and
wherein the second active memory device comprises a second memory vault and the second processing element, the second memory vault services memory requests to a domain in the second memory vault;
acquiring access to the first processing element and the second processing element prior to copying the first code section to first memory vault in the first active memory device.

9. The method of claim 8, wherein transforming, by the compiler, the first code section to executable module code for execution on the main processor and execution on the processing element in the active memory device comprises transforming the first code section to executable module code for execution on the main processor and execution by the first processing element, wherein the executable module code includes copying a portion of the executable module code from the first active memory device to the second active memory device.

10. The method of claim 8, wherein transforming, by the compiler, the first code section to executable module code for execution on the main processor and execution on the processing element in the active memory device comprises generating device acquisition executable module code configured to acquire access to the processing element in the active memory device prior to execution of the executable module code on the processing element in the active memory device.

11. The method of claim 10, wherein transforming, by the compiler, the first code section to executable module code for execution on the main processor and execution on the processing element in the active memory device comprises generating device release executable module code configured to release the processing element in the active memory device following execution of the first code section by the processing element in the active memory device.

12. The method of claim 8, wherein transforming, by the compiler, the first code section to executable module code for execution on the main processor and execution on the processing element in the active memory device comprises transforming executable module code for execution by a first processing element in a first active memory device, the executable module code comprising:
copying the first code section to memory in the first active memory device; and
copying the first code section from the memory in the first active memory device to an instruction buffer in the first processing element.

13. The method of claim 12, wherein the executable module code further comprises copying the first code section from the memory in the first active memory device to a second active memory device.

14. The method of claim 13, wherein copying the first code section from the memory in the first active memory device to the second active memory device comprises copying the first code section from the memory in the first active memory device to memory in the second active memory device.

15. The method of claim 14, wherein the executable module code further comprises copying the first code section from the memory in the second active memory device to a second instruction buffer in a second processing element in the second active memory device.

16. The method of claim 14, wherein the executable module code further comprises executing the first code section in the first processing element and executing the first code section in the second processing element.

17. The method of claim 12, wherein the executable module code further comprises:
copying a second code section to memory in the first active memory device, the second code section being part of the executable module code;
copying the second code section from the memory in the first active memory device to the instruction buffer in the first processing element; and
copying the second code section from the memory in the first active memory device to a third active memory device, wherein the computer system further includes the third active memory device.

18. The method of claim 17, wherein the executable module code further comprises executing the second code section in the first processing element and executing the second code section in a third processing element in the third active memory device.

* * * * *